Nov. 29, 1966 R. B. DACEY 3,288,666

DECORATIVE LAMINATES

Filed April 12, 1963 2 Sheets-Sheet 1

United States Patent Office 3,288,666
Patented Nov. 29, 1966

3,288,666
DECORATIVE LAMINATES
Raymond B. Dacey, Greenville, S.C., assignor to Celanese Corporation of America, New York, N.Y., a corporation of Delaware
Filed Apr. 12, 1963, Ser. No. 272,659
11 Claims. (Cl. 161—5)

This invention relates to a novel, decorative laminate and a method of producing laminates exhibiting novel, decorative effects.

It is an object of this invention to provide a novel, decorative laminate having a uniformly embossed pattern that exhibits gradient visibility in the laminate.

It is another object of this invention to provide a process for the production of the aforementioned laminates.

Still another object of the present invention is to provide a process for the recovery of scrap laminate materials.

Other objects, and a fuller understanding of the invention, may be had by referring to the following description and claims taken in conjunction with the accompanying drawing, in which:

Figure 1A:
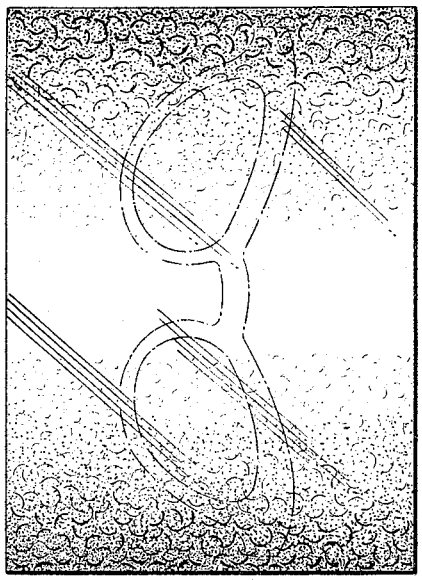
FIGS. 1a and 1b are plan views of novel laminates of the present invention.

It has been found that when a plastic material having a gradient color appearance, which color is provided by an oriented material which exhibits a change in light reflectance when orientation is disrupted, is laminated to a transparent thermoplastic sheet having an embossed undersurface, i.e., the surface that will be internal in the final laminate, the resulting laminate will exhibit an embossed pattern which fades or intensifies with the fading or intensification of the color gradient.

A number of methods are known for providing a gradient color appearance. A gradient color appearance arises when a desired color of a particular color density in a localized area of a sheet material fades gradually from such area into an area of lower color density or into another color which gradually increases in intensity to a second localized area of maximum color density. This may be accomplished by inserting a wedge of colored material into a base material; the wider portion of the wedge provides the greatest color density, which decreases gradually in the direction of the thinner portion. A second method for providing a gradient color appearance is described in detail in U.S. Patent No. 2,985,556 to William P. Rowland. According to that method, a rectilinearly-shaped molten stream of light-transmittable plastic material of a given color and of substantial rigidity at ordinary temperatures is fed through a closed conduit of a suitable rectilinear cross-sectional configuration, joining with the molten stream a rectilinearly-shaped molten ribbon of light-transmittable plastic material of a given color contrasting with the color of the stream of plastic material and of substantial rigidity at ordinary temperatures and having a cross-sectional area such that the ribbon has an area of maximum thickness extending lengthwise thereof, and gradually diminishes in thickness from such area of maximum thickness and for a major part of the width of such ribbon toward a longitudinal edge thereof; the joined plastic materials are then cooled to form a substantially rigid composite strip which exhibits the desired gradient color appearance.

As was noted above, the color for the gradient color appearance is provided by an oriented material which exhibits a change in light reflectance when orientation is disrupted.

One form of oriented material is imitation pearl, which is obtained, for example, when a silky form of certain metal salts such as mercurous chloride, lead iodide, lead carbonate, etc., are incorporated into a plastic base. However, other methods are known, many of which are set forth in U.S. Patent No. 2,363,570 and U.S. Patent No. 2,570,408, as well as the reference cited in the respective files of these patents.

The term "oriented" is used to indicate that the component particles are caused to align themselves in strata in planes parallel to the surfaces. This is accomplished by the flow behavior phenomenon of an essentially adulterated thermoplastic material (e.g., the plastic base material containing the dispersed metal salts) or by electrostatic devices acting on the "pearl essence" prior to and during the solidfying phase of coating, calendering, or extrusion of the carrier material.

In place of a pearl finish, finely-divided metallic particles may be employed. These are introduced into the supporting sheet by the same methods employed for synthetic, nacreous, or pearl essences. These oriented materials may be employed as one of the rectilinearly-shaped molten streams of the aforementioned Rowland process, to provide a pearlized or otherwise oriented color gradient.

Figure 1B:
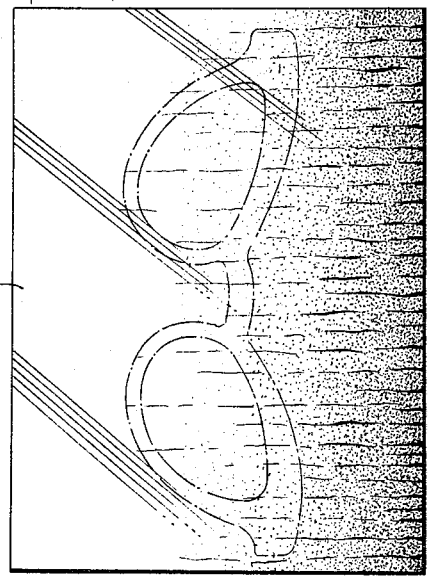
Figure 3:
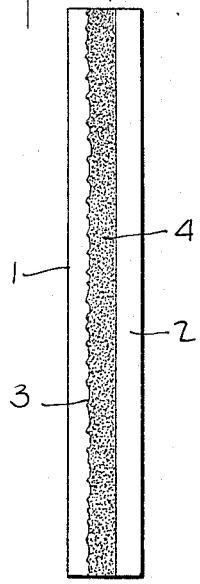
FIG. 3 is a right-side elevation of the laminate of FIG. 1b.
Figure 2:
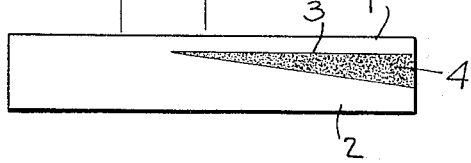
FIG. 2 is a front elevation of the laminate of FIG. 1b.
Figure 4:
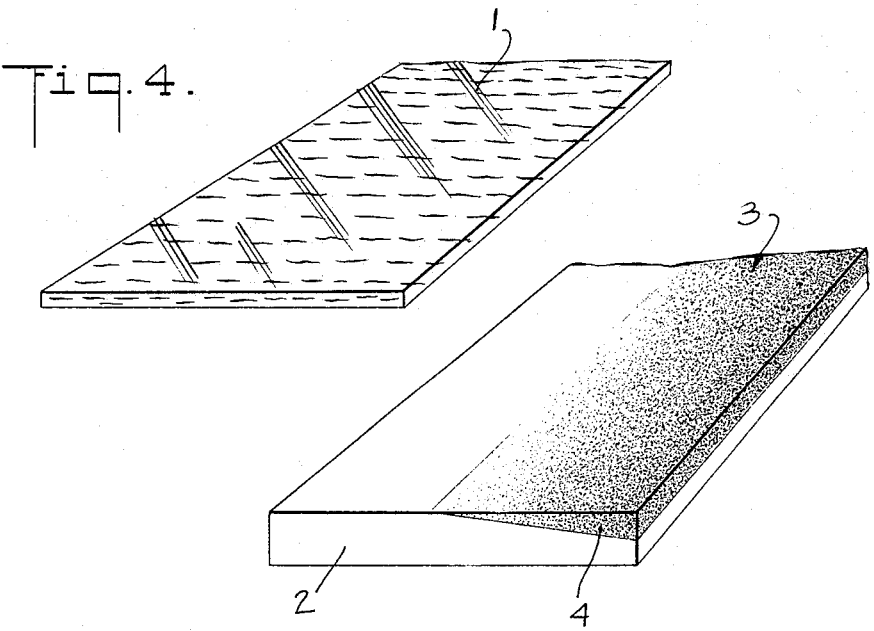
FIG. 4 shows the component part of the laminate of the present invention prior to assembly.

With reference to the drawing, the invention is a decorative laminate from which decorative eyeglass frames may be cut. In FIG. 1a, the laminate is shown with two areas of pearlized color variation, both areas fading from the outer edges toward the center of the laminate and toward each other. The embossed design also fades toward the center even though prior to lamination the embossed design extended across the entire surface of the embossed sheet. FIG. 1b shows a decorative laminate wherein the pearlized color variation fades from one side toward the center. The embossing is shown as deep, generally parallel grooves extending in the direction of color fade. FIG. 4 shows the component elements of the laminate of FIG. 1b prior to lamination. The embossed surface of transparent covering sheet 1 is placed contiguous to the pearlized surface 3 of sheet 2. Wedge 4 is the pearlized colored material which provides the color gradient. On lamination, covering sheet 1 and base sheet 2 fuse at their contiguous surfaces to form a unitary product; this may be observed in the end elevation shown in FIG. 2. As will be noted in the side elevation of FIG. 3, the pearlized color material flows into the embossings of covering sheet 1 thereby disrupting the orientation of the pearlized material. As a result, the embossed pattern appears in the pearlized regions. In the non-pearlized or otherwise unoriented regions of the laminate, the embossed pattern is merely filled in and thus appears to fade out as shown in FIG. 1b.

The embossing of the surface may be effectively accomplished by any of the well-known means, including using embossing rollers or embossing plates, or by impressing fabrics, woven wire cloth or any material or fabricated substance into the surface of the transparent sheet.

By transparent is meant that when the sheet is in contact with a "pearlized" supporting sheet or other oriented material, the color pattern is visible therethrough.

Two sheets are placed in contact and laminated by the application of pressure at an elevated temperature. If desired, the surfaces to be laminated to each other may be treated with a suitable cement prior to lamination. For example, cements comprising polyvinyl chloride organisols plus appropriate plasticizers such as diethyl phthalate or tricresyl phosphates and diluents such as kerosene or varsol are useful since they permit softening of the sheets at the contiguous surface at a lower temperature, thereby lessening the danger of distortion of the sheets. Other transparent cements may be employed. Upon lamination, the pearlized area is disturbed in the regions of the embossings; the pearlized material flows under the pressures and temperatures used for laminating (which are usually within the range of about 300 to 1500 p.s.i. and 100 to 180° C.) and tends to fill the embossed depressions, thereby changing the light reflectance at these points. In the non-pearlized areas, lamination does not cause any substantial change in light reflectance. Thus, if the final laminate is viewed at an angle of 90° with the laminate plane, the embossings will be apparent only in the pearlized regions, and will appear to fade as the color density of the pearlized material decreases.

Figure 5:
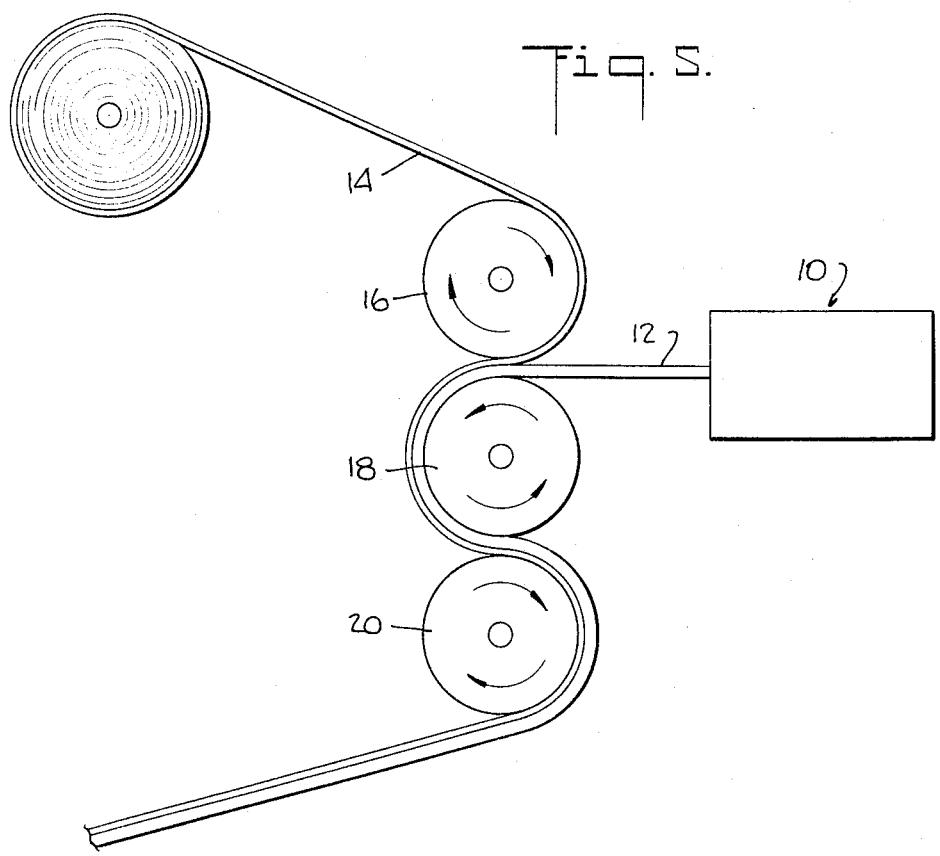
FIG. 5 is a schematic view of a continuous process for producing the laminates of the present invention.

FIG. 5 shows a continuous method for producing the decorative laminate of the present invention. Two or more streams of cellulose acetate, at least one of which is colored orientable material, are simultaneously extruded through an extruder 10 of the type described in the aforementioned Rowland patent. The resulting extruded sheet 12 exhibits, on cooling, a pearlized or otherwise-oriented gradient of the type shown, for example, in FIG. 4. However, prior to the sheet 12 cooling below its particular A.S.T.M. softening point, extruded sheet 12 is contacted by an embossed sheet 14 in a manner such that the embossed surface is contiguous to the surface of sheet 12 having the pearlized or otherwise-oriented material. Sheet 12 and sheet 14 are then pressed together by polishing rolls 16, 18, and 20. The resulting product is cooled to prdouce a novel laminate in accordance with the present invention. By this method, the novel product of the present invention may be produced in a continuous manner without the need for cements or other bonding materials.

In an example of the invention, a molten stream of clear, transparent cellulose acetate and a molten ribbon of taupe-colored orientable cellulose acetate (containing a silky form of lead carbonate to provide the oriented nacreous appearance) were simultaneously extruded in the manner described in the Rowland patent to provide a cellulose acetate sheet having a pearlized taupe color gradient decreasing in color intensity from an outer edge towards the center of the sheet. While the extruded sheet was in the temperature range of 350° F. to about 425° F., an embossed sheet of clear transparent cellulose acetate was pressed against it with the embossed surface in contact with the pearlized surface. The embossed pattern simulated tree bark; generally parallel deep grooves, about 18 mils deep, were embossed in the 20 mil sheet so that the grooves ran across the width of the transparent sheet. When the embossed sheet was pressed against the extruded sheet, the grooves ran generally parallel to the direction of color fade, transverse to the plane of the resulting laminate. The embossed sheet and the extruded sheet were pressed together at a pressure in the range of about 300 to about 1500 p.s.i. exerted on them by polishing rolls. The resulting product exhibited a taupe-colored, bark-like pattern that faded and finally disappeared across the width of the product laminate. Eyeglass frames were cut from this product so that the pattern was at maximum intensity at the top of the frame and faded to transparency at the bottom of the frame, which provided a pleasing appearance for eyeglasses.

The transparent cover sheet and the gradient color material are preferably made of the same themoplastic materials. However, two different but compatible materials may be employed, provided they may be properly laminated. Examples of suitable materials are the several cellulose esters, particularly plasticized secondary cellulose acetate, as well as acrylic and vinyl plastics.

The transparent cover sheet is suitably embossed to a depth of from 1 mil to about 90% of the cover sheet thickness, depending on the nature of the pattern to be reproduced. When cellulose acetate, the preferred thermoplastic material for the purposes of the present invention, is employed, it is preferably plasticized with a material such as triphenol phosphate and diethyl phthalate. With such a plasticized cellulose acetate, a laminating temperature in the range of about 350° F. to about 425° F. and preferably about 390° F. is useful, particularly when using the continuous process of FIGURE 5. It is not essential that the gradient color sheet be transparent; it is sufficient if the base sheet contains an oriented color gradient that fades into an opaque or transparent, but not oriented or orientable region. With such a material, the lamination of a transparent embossed sheet thereto will produce a laminate exhibiting the novel decorative effects of the present invention.

An important advantage of the present invention is that the process may be used to recover scrap materials resulting from the aforementioned Rowland process. In particular, the scrap materials are those in which the orientation of the orientable material is not properly directed or is not in the desired direction. Since such scrap cannot be re-used in the ordinary manner because of the presence of different coloring materials, etc., the use of such scrap has been limited. By laminating such scrap materials to embossed transparent sheeting as described herein, these materials then become useful since the superimposed, embossed pattern, by disrupting the oriented pattern, can correct or override the original orientation. The product is then useful in the same way as the original products was to be used.

It is to be understood that the foregoing detailed description is given merely by way of illustration and that many variations may be made therein without departing from the spirit of my invention.

Having described my invention what I desire to secure by Letters Patent is:

1. As an article of manufacture, a composite decorative laminate comprising a sheet of a transparent thermoplastic material having a relief pattern in its under-surface and bonded at said under-surface to the upper surface of a thermoplastic supporting sheet, said upper surface of said supporting sheet having a gradient color appearance, the colored material producing said gradient color appearance comprising an oriented material characterized by a change in light reflectance when orientation is disrupted.

2. An article in accordance with claim 1 wherein the oriented material is pearlescent material.

3. As an article of manufacture, a composite decorative laminate comprising a sheet of a transparent cellulose ester having a relief pattern in its under-surface and bonded at said under-surface to the upper surface of a cellulose ester supporting sheet, said upper surface of said supporting sheet having a gradient color appearance, the colored material producing said gradient color appearance comprising an oriented material characterized by a change in light reflection when orientation is disrupted.

4. An article in accordance with claim 3 wherein the oriented material is pearlescent material.

5. As an article of manufacture, a composite decorative laminate comprising a sheet of a transparent cellulose acetate having a relief pattern in its under-surface and bonded at said under-surface to the upper surface of a cellulose acetate supporting sheet, said upper surface of said supporting sheet having a gradient color appearance, the colored material producing said gradient color appearance comprising an oriented material characterized by a change in light reflectance when orientation is disrupted.

6. An article in accordance with claim 5 wherein the oriented material is pearlescent material.

7. A process for producing decorative laminates comprising:
(1) applying to a surface of a transparent sheet of a thermoplastic material a relief pattern;
(2) locating the pattern surface of said transparent sheet contiguous with a surface of a support sheet having a gradient color appearance wherein the color is produced by an oriented material characterized by change in light reflectance when orientation is disrupted; and
(3) bonding said contiguous surfaces to each other.

8. A process in accordance with claim 7 wherein the oriented material of the support sheet is pearlescent material.

9. A continuous process for producing decorative laminates comprising:
(1) applying to a surface of a transparent sheet of thermoplastic material with a relief pattern;
(2) continuously extruding a support sheet having a gradient color appearance wherein the color is produced by an oriented material characterized by a change in light reflectance when orientation is disrupted;
(3) continuously juxtaposing said transparent sheet and said support sheet; and
(4) pressing said sheets together to bond them while said extruded support sheet is at a temperature above its softening point.

10. A process in accordance with claim 9 wherein the laminate sheets are cellulose acetate.

11. A process in cacordance with claim 10 wherein the support sheet is at a temperature of about 390° F. to about 425° F. at the commencement of lamination.

References Cited by the Examiner
UNITED STATES PATENTS

| | | |
|---|---|---|
| 2,133,081 | 10/1938 | Colvin. |
| 2,985,556 | 5/1961 | Rowland. |
| 3,024,147 | 4/1962 | Brooks et al. _____ 156—209 XR |
| 3,150,031 | 9/1964 | Powell. |

FOREIGN PATENTS

| | | |
|---|---|---|
| 986,978 | 4/1951 | France. |

ALEXANDER WYMAN, *Primary Examiner.*

JACOB STEINBERG, *Examiner.*